United States Patent [19]
Bilotti et al.

[11] Patent Number: 5,457,364
[45] Date of Patent: Oct. 10, 1995

[54] BRIDGE MOTOR DRIVER WITH SHORT-CIRCUIT PROTECTION AND MOTOR-CURRENT LIMITING FEATURE

[75] Inventors: Alberto Bilotti, Florida; Jose L. Tallarico, Buenos Aires, both of Argentina

[73] Assignee: Allegro Microsystems, Inc., Worcester, Mass.

[21] Appl. No.: 182,327

[22] Filed: Jan. 18, 1994

[51] Int. Cl.$^6$ .................................................. H02K 17/32
[52] U.S. Cl. ..................... 318/434; 318/811; 363/56
[58] Field of Search ................ 323/365; 318/434, 318/254, 138, 439, 811, 801; 363/41, 55, 56

[56] References Cited

U.S. PATENT DOCUMENTS

| | | | |
|---|---|---|---|
| 3,465,206 | 9/1969 | Harker et al. | 318/663 |
| 4,574,228 | 3/1986 | Blue et al. | 318/696 |
| 4,639,611 | 1/1987 | Sticher | 323/365 |
| 4,682,095 | 7/1987 | Shibata et al. | 318/811 |
| 4,755,728 | 7/1988 | Ban | 318/254 |
| 4,819,117 | 4/1989 | Brennan et al. | 361/18 |
| 4,933,799 | 6/1990 | Lai et al. | 361/25 |
| 5,012,169 | 4/1991 | Ono et al. | 318/811 |
| 5,057,765 | 10/1991 | Clark et al. | 323/288 |
| 5,111,123 | 5/1992 | Hach et al. | 318/434 |
| 5,153,492 | 10/1992 | Landseadel | 318/434 |
| 5,256,949 | 10/1993 | Reichard et al. | 318/254 |
| 5,280,228 | 1/1994 | Kanouda et al. | 318/811 |
| 5,291,106 | 3/1994 | Murty et al. | 318/254 |

*Primary Examiner*—William M. Shoop, Jr.
*Assistant Examiner*—Karen Masih

[57] ABSTRACT

A full-wave bridge driver has four driver transistors. A motor is connected to the output terminals of the bridge. A fault detector latches off the four driver transistors when the bridge current jumps essentially instantaneously to exceed a predetermined safe-peak value due to a fault occurring in the bridge. A comparator has a predetermined current threshold, that is less than the predetermined safe-peak value of the fault detector, and is connected to a bridge-current sensing resistor for, when the bridge current exceeds the current threshold, producing a signal proportional to the difference between the bridge current and the current threshold. A pulse-width-modulator is connected to the comparator means output, and during periods such as at motor starting when the bridge current gradually exceeds the comparator threshold value, chops the signal at the bases of the four driver transistors, varying the chopped pulse widths to hold the motor current at essentially the threshold current value. For faults that occur across the motor or between the motor and either of the DC-supply terminals, the fault current paths in the bridge do not flow through the inductance of the motor and produce a sharp rising bridge fault current that is essentially transparent to the pulse width modulator which clamps high motor start currents at a level below that at which the fault detector trips the latch and shuts off the driver transistors.

2 Claims, 2 Drawing Sheets

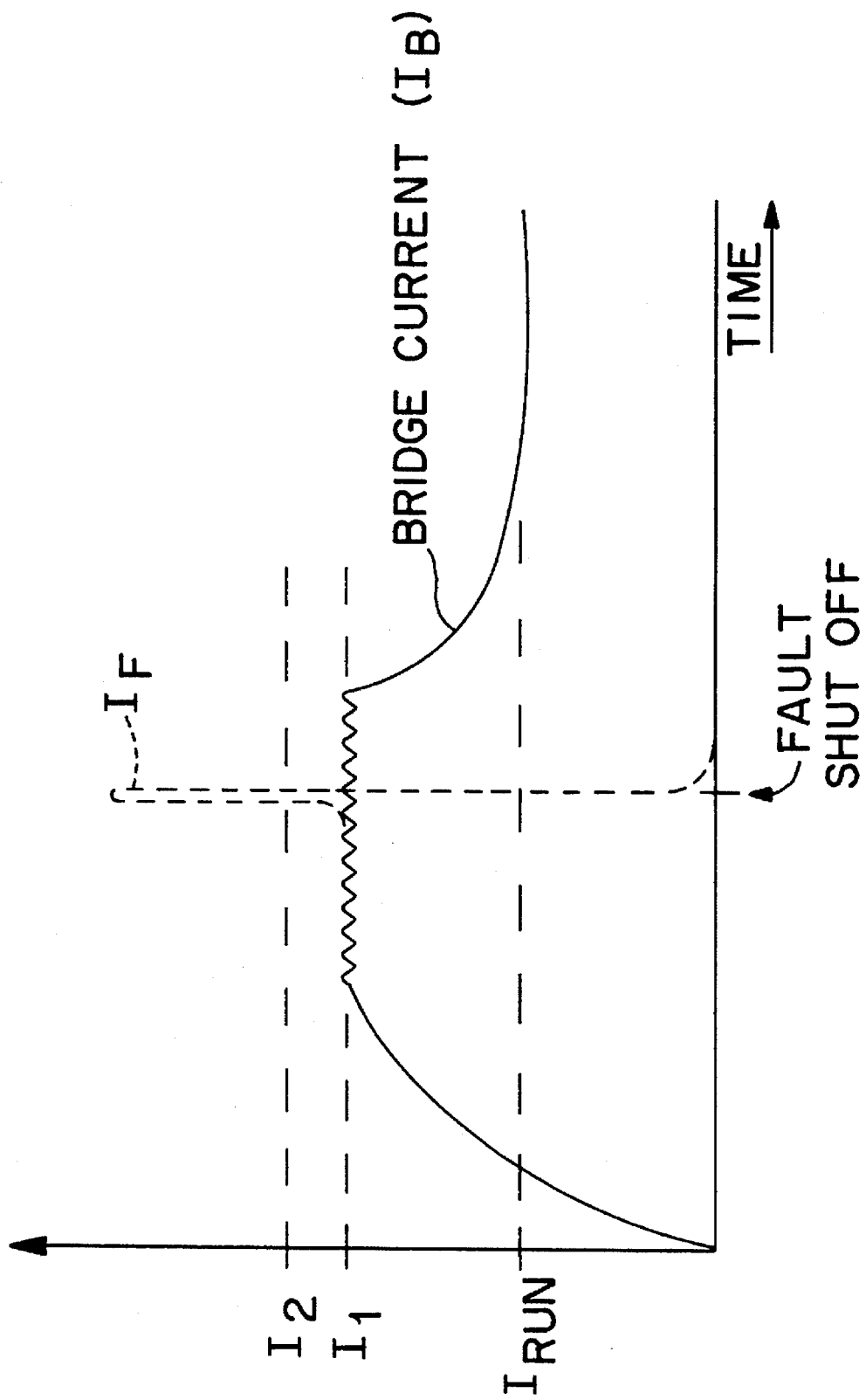

5,457,364

BRIDGE MOTOR DRIVER WITH SHORT-CIRCUIT PROTECTION AND MOTOR-CURRENT LIMITING FEATURE

BACKGROUND

This invention relates to a transistor bridge for driving a motor, including a short-circuit detector for shutting down the bridge driver upon detection of a fault, and more particularly to such a bridge that includes a circuit for clamping the bridge current by chopping the drive-signal to the bridge transistors, especially during starting, to a value less than that which triggers the short-circuit detector to shut off the bridge transistors.

Various load fault protection circuits have been used in motor drivers for sensing the driver current, or only the motor current, and shutting down the motor driver when the sensed current exceeds a predetermined value. Some electrical loads, and particularly motors, draw a large amount of current during the starting phase. The large starting current typically decays to a steady state operating value corresponding to a normal running condition.

To prevent a false indication of an electrical fault in a load having a high starting in-rush current, some electrical short circuit detectors have included time-delay circuits that disable the fault detector during the usual period of high in-rush current at starting, exposing the bridge to possible destruction for a short interval during starting.

Another solution to this problem is provided by a load driver with a short circuit protection circuit wherein during the motor-starting-current in-rush period, the threshold at which the short circuit detector triggers load shut off is itself modified, e.g. raised to temporarily allow starting with higher than normal-running motor current without triggering driver shut-off by the short circuit protection circuit.

To take into account tolerances in the motor starting current, this altered threshold must be raised well over the nominal start peak current, reducing the degree of protection. It also requires large time constants which are difficult to achieve in integrated circuit drivers.

It is an object of this invention to provide a full-wave-motor driver having a short circuit current detector that shuts down the bridge under all motor operating conditions.

It is a further object of this invention to provide such a motor driver having an operating mode that is independant of of tolerances in the peak motor starting current.

It is yet a further object of this invention to provide such a motor driver that includes circuits requiring no large time constants.

SUMMARY OF THE INVENTION

A full-wave bridge driver has four driver transistors connected in bridge configuration, i.e. in H-bridge configuration. The bridge is connected between two DC-supply-voltage terminals. A pair of motor terminals are the bridge output or motor-load terminals, i.e. are located respectively at the junctions between each of two pairs of the driver transistors that form the two series totem-pole branches of the bridge. A fault detector means is connected to the bridge for latching off the four driver transistors when the bridge current drawn by the bridge from a DC-supply terminal jumps essentially instantaneously to exceed a predetermined safe-peak value due to a fault occurring in the bridge.

A bridge-current sensing means is included for producing a bridge-current signal that is proportional to the bridge current. A comparator means having a predetermined current threshold, that is less than the predetermined safe-peak value, is connected to the bridge-current sensing means for, when the bridge current exceeds the current threshold, producing a signal proportional to the difference between the bridge current and the current threshold.

A pulse-width-modulator means is connected to the comparator means and to the four driver transistors for during periods such as at motor starting when the bridge current gradually exceeds the comparator threshold value, chopping the signal at the control elements of the four driver transistors and varying the chopped pulse widths to hold the motor current at the threshold current value.

The pulse-width-modulator means preferably operates at a low chopping rate having a chop period that is at least an order of magnitude greater than the rise time of a fault current attributable to faults across the motor terminals or from a motor terminal to one of the DC-supply terminals. Such faults are meant to include a short and other low impedances relative to that of the motor.

This invention recognizes that for faults occurring in a bridge circuit path that does not include the inductance of the motor, the bridge fault current will rise almost instantaneously. It is further recognized in this invention that large motor-start inrush currents are gradual changing currents. The pulse width modulator in the clamping or bridge-current limiting circuit, wherein the bridge current controls the pulse width of the chopped output, is essentially transparent to fast fault currents, so that for all motor operating conditions, including starting and rotor locked conditions, the pulse width modulator does not respond to low inductance path faults so that such fast-rising fault currents penetrate the current threshold of the start current clamp circuit and trigger the over current fault detector. Therefore, fast fault bridge currents in paths not including the motor inductance, are readily detected for all motor operating conditions, independent of the actual peak starting current.

BRIEF DESCRIPTION OF THE DRAWING

FIG. 2 shows graph of the bridge current, in the bridge motor driver of FIG. 1, during motor starting and subsequent motor running conditions.

DESCRIPTION OF THE PREFERRED EMBODIMENT

Figure 1:
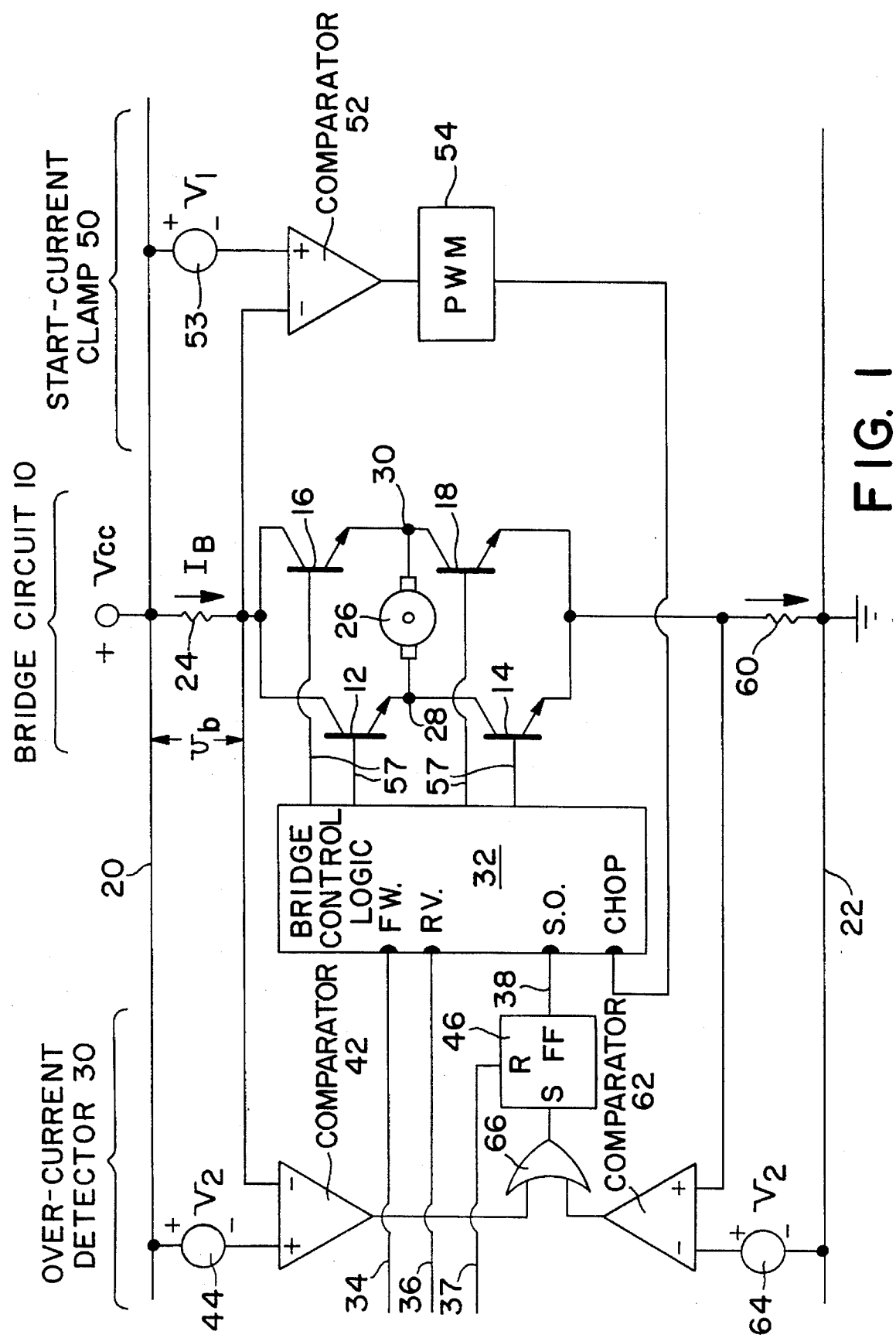
FIG. 1 shows a full wave bridge motor driver of this invention with an over-current fault detector capable of shutting off the driver when a fault appears across the motor or between one of the motor terminals and either one of the DC-voltage supply terminals, and a circuit for limiting the motor start current to less than the fault detector threshold.

In FIG. 1, a full-wave bridge circuit 10 has a pair of transistors 12 and 14 connected in one series totem pole branch, and another pair of transistors 16 and 18 connected in another totem pole branch. These two branches are connected in parallel and form the two series branches of the full-wave bridge circuit 10. These two bridge branches are connected between the DC supply busses 20 and 22 via a bridge-current sensing resistor 24. A motor 26 has two motor terminals connected to the bridge output terminals 28 and 30.

A conventional bridge control logic 32 has four outputs connected respectively to the bases of the four driver transistors 12, 14, 16 and 18, and also has a forward (FW) input signal conductor 34 and a reverse (RV) input signal conductor 36 by which the bridge control logic turns on the bridge driver transistors 12, 14, 16 and 18 in the sequence causing the motor to be driven respectively in the forward and reverse directions. The bridge control logic 32 further has a shut-off (S.O.) input signal conductor 38 by which a binary input signal of one level turns off all four driver transistors 12, 14, 16 and 18, and alternately by which a binary input signal of the other level at conductor 38 enables normal driving of the motor 26 in either the forward or reverse directions.

An over-current detector 30 has a zero-voltage threshold comparator 42 with one input connected to the junction of the bridge and the current sensing resistor 24, and the other input connected via a DC-voltage bias source 44 to the DC supply buss 20 to which the current sensing resistor 24 is connected. The binary output of the comparator 42 is connected to the "set" input of the latching flip flop 46. Thus in the event that a fault, accidently occurs between the motor terminals and ground or across the motor so that the voltage dropped across the bridge current sensing resistor 24 is greater than the DC bias voltage $V_2$, then the binary output voltage from the comparator 42 becomes high to set the latching flip flop 46.

After the fault has been removed, the motor 26 may be restarted by applying a signal to the reset input conductor 37 of the latch 46.

When flip flop 46 is set, its output goes high and this high binary signal at the bridge control logic shut-off conductor 38 causes the bridge control logic 32 to turn off the four driver transistors 12, 14, 16 and 18 to avoid damage by the large fault current that may flow in one or more of the driver transistors.

For example transistors 12 and 18 may normally be turned on simultaneously by the control logic at the time a short occurs between motor terminal 28 and ground buss 22; the turned-on transistor 12 is thereby connected across the DC supply busses 20 and 22 with only the small ohmic value sensing resistor 24 serving to limit the current, and transistor 12 is likely to be destroyed.

The over-current detector 30 thus far described is only capable of shutting off the drivers in response to a fault occuring across the motor 26 or between a motor terminal 28 or 30 and the ground buss 22, but not to Vcc buss 20. This is so because a short from a motor terminal to the Vcc buss 20 shorts the bridge current-sensing resistor 24.

In order for the over-current detector 30 to be capable of shutting off the driver transistors for a fault between either of the DC-supply busses and a motor terminal, another bridge current sensing resistor 60 is interposed between the bridge 10 and the ground buss 22; another zero-threshold-voltage comparator 62 has an input connected to the junction of bridge and and sensing resistor 60, and the other input connected to ground buss 22 via another DC-voltage bias source 64. The outputs of the two comparators 42 and 62 are connected respectively to the two inputs of an OR gate 66, which has an output connected to the set input of the flip flop latch 46.

A start-current clamp circuit 50 has two inputs connected across the current sensing resistor 24. The comparator 52 is composed simply of a differential amplifier so that the output of comparator 52 provides a positive voltage output signal when the voltage ($v_b$) across the sensing resistor 24 is greater than the reference bias voltage, $V_1$ of voltage source 53. When $v_b$ is less than $V_1$, the output of comparator 52 is a negative voltage, and the corresponding output of the pulse width modulator 54 is a continuous high signal voltage that enables the bridge driver transistors 12, 14, 16 and 18 to be fully responsive (not chopped) to the control signals on input conductors 34 and 36.

However, when during starting the starting inrush bridge current $I_M$ reaches $I_1$, i.e. vb equals $V_1$, the output of comparator 52 becomes a positive voltage proportional to the magnitude of bridge current $I_B$. It is at this point that the pulse width modulator 54 begins to repeatedly chop out a portion of the formerly continuous PWB output voltage, to effectively clamp the bridge current $I_B$ to the value $I_1$.

The output of the comparator 52 is connected to the input of the pulse width modulator 54. Thus the combination of comparator 52, reference-bias-voltage source 53 and the bridge-current sensing resistor 24 amounts to a current comparator having a current threshold that is equivalent to the quotient $V_1/Rs$ where Rs is the resistance of the sensing resistor 24.

From another view point, the pulse width modulator 54 has a binary high output when the output of the comparator 52 is negative, i.e. when the voltage dropped across the sense resistor 24 is less than the reference bias voltage V1; and when the voltage dropped across the sense resistor 24 is greater than the reference bias voltage V1, and the binary high output of the pulse width modulator 54 becomes a series of binary high pulses having a width inversely proportional to the difference between the voltage across sensing resistor 24 and the bias reference voltage $V_1$.

During a period when the motor is starting and a higher than normal running current is drawn by the motor 26 through the sensing resistor 24, the bridge current, $I_B$, may be high enough to trip the over-current detector 30 and shut down the bridge circuit 10. To avoid this, the bias voltage $V_1$ of source 53 is made lower than the bias voltage $V_2$ of bias source 44; consequently, when the starting current reaches the value $I_1$, at which the output of the comparator 52 goes positive, the pulse width modulator output begins to be chopped and the driver transistors 12, 14, 16 and 18 accordingly receive from the four outputs 57 of the bridge control logic 32 a chopped drive voltage that keeps the four drive transistors 12, 14, 16 and 18 at a duty factor corresponding to that which maintains the bridge current essentially clamped at $I_1$.

Referring to FIG. 2, the bridge current $I_B$ is shown rising toward a high inrush current at starting, being clamped to the current level $I_1$, and then the bridge current $I_B$ subsides and levels out at a value, $I_{RUN}$, corresponding to a fixed motor load. During the starting phase, when bridge current $I_B$ reaches the level $I_1$, corresponding to the voltage across the sensing resistor 24 that equals the bias reference voltage $V_1$, the bridge current $I_B$ is clamped to the value $I_1$ by the above described chopping of the drive to the base of drive transistors 12, 14, 16 and 18 until it again falls below the value $I_1$.

It is important to consider that during a starting period when the bridge current $I_B$ is clamped at $I_1$, the start current clamp circuit 50 operates by comparing a relatively slow growing bridge current with a fixed reference voltage $V_1$ owing to the substantial inductance of the motor 26.

On the other hand, if a fault occurs during this clamping phase across the motor terminals 28 and 30, or from a motor terminal to either one of the DC-voltage-supply terminals 20 or 22, then a bridge totem pole fault will occur which fault path does not include the motor 26 and is relatively non inductive. In this case, the fault current, $I_F$, that is not slowed by motor inductance almost instantly jumps to a high value as indicated in FIG. 2; and the pulse width modulator, which operates by chopping cannot follow such a fast fault current, is effectively transparent to the fault current $I_F$. Therefore a fault occurring during start up will go through the current level $I_1$ and reach the shutoff threshold without initiating the clamping action of the pulse width modulator 54.

The clamping action of the pulse width modulator 54 will be effective for any over-current going through the motor inductance. Thus a motor locked fault will also cause the pulse width modulator to clamp the bridge current to the threshold current, $I_1$.

A further description of full-wave bridge motor driver with short circuit protection is described in the patent application by the same inventors entitled BRIDGE MOTOR DRIVER WITH SHORT-CIRCUIT PROTECTION AND AN AUTOMATIC RESTARTING FEATURE that is filed simultaneously herewith, and that co-filed application is incorporated by reference herein.

We claim:

1. A full-wave bridge driver of the kind having two DC-supply-voltage terminals, four driver transistors connected in a circuit configured as a transistor bridge having two motor load terminals to which a motor may be connected, said bridge being connected between said two DC-supply-voltage terminals, and a fault detector means connected to said bridge for latching off said four driver transistors when the bridge current drawn by said bridge from said DC-supply terminals jumps essentially instantaneously to exceed a predetermined safe-peak value due to a fault occurring in said bridge; wherein the improvement comprises:

a) a bridge-current sensing means for producing a bridge-current signal that is proportional to the bridge current;

b) a comparator means having a predetermined current threshold that is less than said predetermined safe-peak value, connected to said bridge-current sensing means for when the bridge current exceeds said current threshold producing a signal proportional to the difference between the bridge current and said current threshold; and c) a pulse-width-modulator means connected to said comparator eans and to said four driver transistors for only during periods when the bridge current exceeds the comparator threshold value, chopping the signal at said control elements of said four driver transistors and varying the chopped pulse widths to hold the bridge current at said threshold current value.

2. A full-wave bridge driver of the kind having two DC-supply-voltage terminals, four driver transistors connected in an H-bridge configured circuit that is connected between said two DC-supply-voltage terminals, a pair of motor terminals to which a motor may be connected located respectively at the junctions between each of the two of said driver transistors forming the two series branches of said bridge circuit, and a fault detector means connected to said bridge circuit for latching off said four driver transistors when the bridge-circuit current drawn from said DC-supply terminals jumps essentially instantaneously to exceed a predetermined safe-peak value; wherein the improvement comprises:

a) a bridge-current sensing means for producing a bridge-current signal that is proportional to the current drawn by said bridge from said DC-supply-voltage terminals;

b) a comparator means, having a predetermined current threshold that is less than said predetermined safe-peak value, connected to said bridge-current sensing means for when the bridge current exceeds the current threshold producing a signal proportional to the difference between the bridge current and said current threshold; and c) a pulse-width-modulator means connected to said comparator means and to said four driver transistors for when the bridge current during motor starting exceeds the comparator threshold value, chopping the signal at said control elements of said four driver transistors and varying the chopped pulse widths to hold the bridge current at said threshold value.

* * * * *